Figure 1:
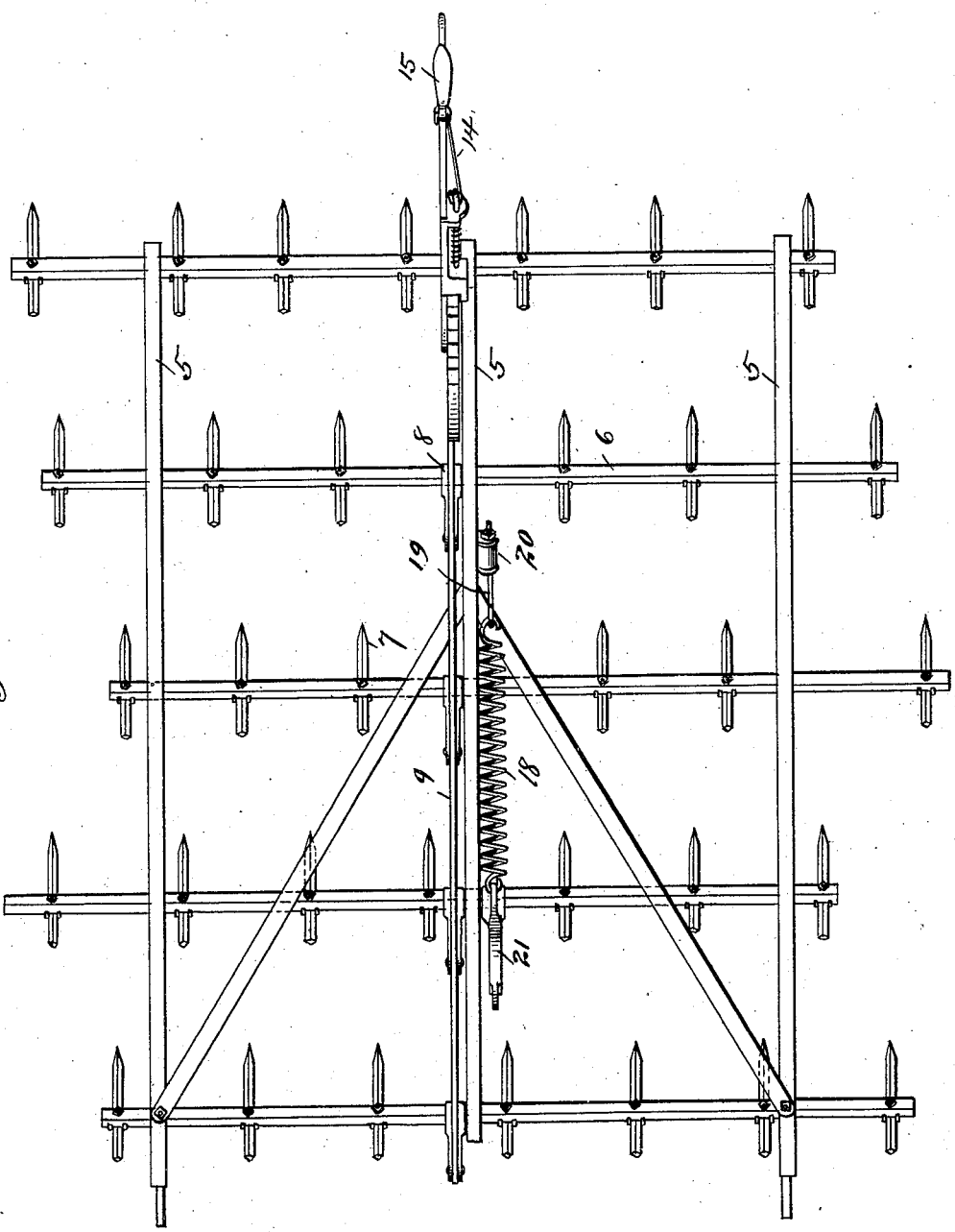

No. 693,882. Patented Feb. 25, 1902.
J. B. MORRISON.
HARROW.
(Application filed Feb. 21, 1901.)
(No Model.) 2 Sheets—Sheet 1.

Witnesses,
J. J. Mann
S. N. Pond

Inventor,
Joseph B. Morrison,
By Offield, Towle & Linthicum
Atty's.

No. 693,882. Patented Feb. 25, 1902.
J. B. MORRISON.
HARROW.
(Application filed Feb. 21, 1901.)
(No Model.) 2 Sheets—Sheet 2.
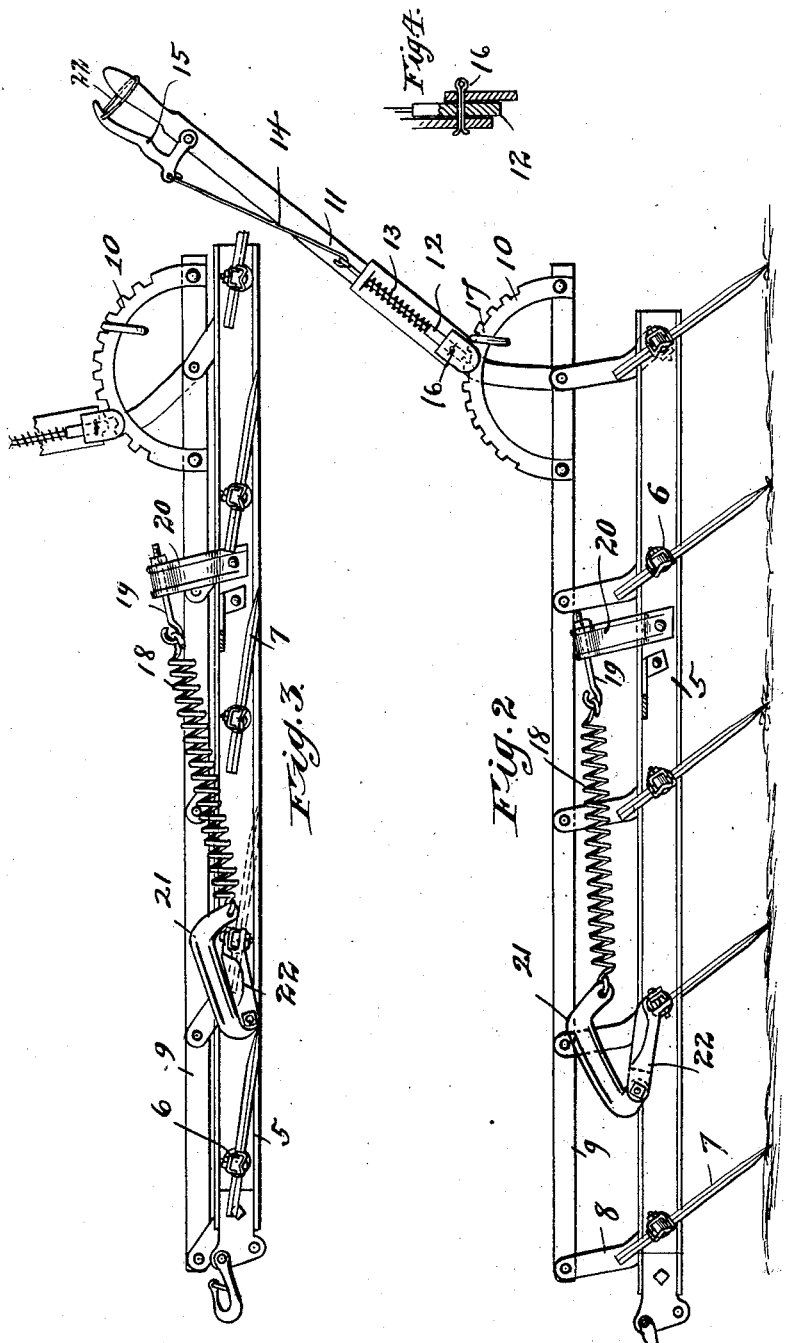
Witnesses,
Inventor,
Joseph B. Morrison,
By Offield, Towle & Linthicum
Atty's.

UNITED STATES PATENT OFFICE.

JOSEPH B. MORRISON, OF FORT MADISON, IOWA, ASSIGNOR TO MORRISON MANUFACTURING COMPANY, OF FORT MADISON, IOWA, A CORPORATION OF IOWA.

HARROW.

SPECIFICATION forming part of Letters Patent No. 693,882, dated February 25, 1902.

Application filed February 21, 1901. Serial No. 48,228. (No model.)

*To all whom it may concern:*

Be it known that I, JOSEPH B. MORRISON, of Fort Madison, Iowa, have invented certain new and useful Improvements in Harrows, of which the following is a specification.

This invention relates to that class of harrows in which the harrow-teeth are fixed to tooth-bars which are mounted to rock in the frame, the several tooth-bars being connected and controlled by a single lever, so that the teeth can be set and adjusted in any desired angular position.

My invention consists, broadly stated, in the employment of a spring or elastic connection between the frame and the tooth-bars, in combination with a normally unlocked adjusting-lever, whereby the harrow-teeth are held normally in a set position determined by the setting of the stop of the operating-lever, but are permitted to yield to pass an obstruction encountered by any one of the teeth, all of which are restored to the normal position by the spring when the obstruction is passed.

Preferably I connect one end of the spring to one of the frame-bars by means of a lug or bracket and an eyebolt and the other end of the spring to an arm on one of the tooth-bars through the medium of a pivoted link, the connection being made in such manner that the link forms a lock when the teeth are thrown back to the full extent permitted by the connections. The locking-lever I prefer to provide with a spring-actuated dog normally held out of engagement with the teeth of the ratchet-plate and to employ a link on the ratchet-plate to furnish a back-stop to the operating-lever.

In the accompanying drawings, Figure 1 is a plan view, partly broken away, of a harrow-section embodying my improvements. Fig. 2 is a side elevation of the same, showing the parts in the working position with the teeth extended, so as to penetrate the ground. Fig. 3 is a side elevation showing the tooth-bars rocked to carry the points of the teeth backward in position to clear them of trash and showing the spring fully extended and points of connection in line, so that the spring is locked; and Fig. 4 is a sectional detail of the plunger-bolt or locking-dog and its keeper and showing the locking-pin therefor.

In the drawings, 5 represents the frame-bars, which are preferably metal beams of I-section.

6 represents the tooth-bars, which are of U form, as shown in Fig. 2, and to which are clamped the harrow-teeth 7. The tooth-bars are mounted so as to rock in the frame members, and the several bars have upstanding arms 8, all of which are pivotally connected by the link 9. Said link carries at its rear end the ratchet-plate 10.

11 represents the lifting-lever, which is pivoted to the frame and has a locking-dog or plunger-bolt 12, adapted to the teeth of the ratchet-plate 10. This dog is normally depressed by the coil-spring 13 and may be manipulated through the link 14 and latch 15. By means of the lever and its dog the teeth can be set at any desired inclination and there locked if it be desired to provide a rigid construction. For the purposes, however, of providing an elastic connection between the tooth-bars and the frame I prefer to hold the dog 12 out of engagement with the ratchet, and this may be done, as shown in Fig. 4, by means of the cotter-pin 16. A loose link 17 or other equivalent back-stop device may be used, so as to hold the lever at any desired position forward of its extreme backward limit of movement. When the dog is held out of engagement with the ratchet, the lever is of course free to play back and forth, and the teeth may be adjusted to any position permitted by the range of movement of the lever in front of its back-stop. In order to provide an elastic or yielding connection between the tooth-bars and the frame and to maintain the teeth in an operative position, while at the same time permitting them to yield to obstructions, I employ the extension-spring 18, which is connected at its rear end to the eyebolt 19, the latter passing through an aperture in an arm or bracket 20, bolted to the frame-bar. The front end of the spring is connected to the bent lever 21, which in turn is pivoted to the crank 22, rigidly connected to one of the tooth-bars. Obviously the strength of the spring being duly proportioned the teeth will be held in a working position, such as shown in Fig. 2, but are capable of yielding to pass an obstruction. The spring being arranged to exert a constant pull, as soon as the teeth have passed such obstruction they will be automatically returned to the working position. This construction affords two important results—namely, that it enables a more thorough cultivation of the ground, owing to the constant vibratory action of the teeth, and, second, all jerking against the shoulders of the draft-animals is prevented, the elastic or yielding connection of the tooth-bars to the frame enabling the passing of obstructions without noticeable jerk.

By throwing the lever to the extreme forward position, as shown in Fig. 3, the teeth may be inclined at such an angle to the frame as to permit them to be entirely cleared of trash or to pass an unusual obstruction. For this purpose it is desirable that the spring shall be prevented from acting temporarily, and to this end I employ the bent lever or an equivalent construction, which will enable the point of connection with the crank-arm on the tooth-bar to pass below or in line with a plane drawn through the axis of the tooth-bar and the fixed end of the spring. When so connected, the spring is temporarily neutralized, as shown in Fig. 3, and the harrow may advance while it is being cleared of trash or be transferred between fields without having the points of the teeth penetrating the ground.

When it is desired to restore the harrow to working position, it is only necessary for the driver to exert sufficient force upon the lever 11 to carry the end of the arm 22 slightly out of line, whereupon the tension of the spring will immediately return the teeth to their normal position even against the resistance of the soil. This operation has heretofore been laborious, because the driver had not only through the hand-lever to overcome the friction of the several bearings, but also the resistance of the soil through which the teeth were being advanced. With the construction above described the teeth may be thrown out of action and restored to the normal working position with the expenditure of slight force and during operation are constantly held by an elastic or yielding connection, thus rendering the implement more effective, while avoiding injury to the shoulders of the draft-animals and the danger of breaking the teeth when encountering obstructions.

While I have described a particular construction and combination of parts, it is obvious that my improvements are applicable to harrows of different structure and that some of the parts shown may be omitted. For example, I have shown an operating-lever provided with a locking-dog adapted to work in conjunction with a ratchet-plate. This is the usual construction; but it provides a rigid harrow—that is, one which is without yield during operation. I have shown my improvements applied to such a harrow, because it may be found desirable to combine such improvements with a harrow of such usual construction; but it will be understood that the lifting-lever is not an essential feature of the combination and that the lifting-lever, link, and ratchet-plate form for the broader purposes of my invention a single element—i. e., a back-stop—and that such back-stop might be provided in other ways were the lifting-lever and ratchet-plate omitted, since the driver will usually throw the points of the teeth back and clear the harrow of trash by placing his foot on the upper end of one of the teeth or on the frame, while to break the lock a slight pull on the frame with the points of the teeth held against backward movement will bring the spring into action and restore the harrow to working position. I prefer to use the lifting-lever, with its locking-dog and the ratchet-plate, for convenience in handling the harrow and also to adapt it to be used in the old way when desired; but instead of the locking-pin 16 any other convenient locking device to hold the dog out of action may be employed, such as the ring-latch 22. (Shown in Fig. 2.) The frame of the harrow may be made from gas-pipe or angle-bars or of any other suitable construction, and other of the structural details may be varied within the scope of this invention.

I claim—

1. In a harrow of the class described, the combination with the frame, of a series of connected tooth-bars mounted to rock therein, a crank secured with one of said tooth-bars and a spring connected at one end to the harrow-frame and at the other to the crank, said point of connection being adapted to be moved into line with the axis of the tooth-bar and the point of connection of the spring to the frame, substantially as described.

2. In a harrow of the class described, the combination with a rigid main frame, of a series of parallel tooth-bars mounted to rock therein, each of said bars being provided with an upstanding crank-arm projection, a link pivotally connected with the several cranks of the tooth-bars whereby they are connected to move in unison, a notched segment carried by said link, a locking-lever rigidly connected with one of the rocking tooth-bars and arranged to coöperate with said segment, and a coiled contractile spring connected at one end with the rigid frame, and at its opposite end with a crank-arm rigidly mounted upon one of said rocking tooth-bars, substantially as described.

3. In a harrow of the class described, the combination with a rigid main frame, of a series of parallel tooth-bars mounted to rock therein, each of said bars being provided with an upstanding crank-arm projection, a link pivotally connected with the several cranks of the tooth-bars whereby they are connected to move in unison, a notched segment carried by said link, a locking-lever rigidly connected with one of the rocking tooth-bars and arranged to coöperate with said segment, a coiled contractile spring connected at one end with the rigid frame, and at its opposite end with a bent link, and a crank-arm upon one of said rocking tooth-bars with which said bent link is operatively connected, the relative arrangement of the spring, bent link and crank-arm being such that the spring may be moved into position to exert its tension to either hold the teeth in or out of operative position, substantially as described.

JOSEPH B. MORRISON.

Witnesses:
EDGAR W. CAMP,
V. E. MORRISON.